(12) United States Patent  (10) Patent No.: US 12,310,381 B2
Philp et al.  (45) Date of Patent: May 27, 2025

(54) CHEESE PRODUCT WITH CARRAGEENAN CASING

(71) Applicant: HL Commodity Foods Ltd, Hospital (IE)

(72) Inventors: Kevin Philp, Carrigaline (IE); Karen Anne O'Callaghan, Enniskeane (IE)

(73) Assignee: HL COMMODITY FOODS LTD, Hospital (IE)

( * ) Notice: Subject to any disclaimer, the term of this patent is extended or adjusted under 35 U.S.C. 154(b) by 285 days.

(21) Appl. No.: 17/909,135

(22) PCT Filed: Mar. 4, 2021

(86) PCT No.: PCT/IB2021/051817
§ 371 (c)(1),
(2) Date: Sep. 2, 2022

(87) PCT Pub. No.: WO2021/176392
PCT Pub. Date: Sep. 10, 2021

(65) Prior Publication Data
US 2023/0112899 A1  Apr. 13, 2023

(30) Foreign Application Priority Data

Mar. 5, 2020 (GB) .................................... 2003196

(51) Int. Cl.
*A23C 19/076* (2006.01)
*A21D 13/41* (2017.01)
(Continued)

(52) U.S. Cl.
CPC .......... *A23C 19/0765* (2013.01); *A21D 13/41* (2017.01); *A23C 19/09* (2013.01); *A23C 19/16* (2013.01)

(58) Field of Classification Search
CPC ..... A23C 19/0765; A23C 19/09; A23C 19/16; A21D 13/41
(Continued)

(56) References Cited

U.S. PATENT DOCUMENTS 3,453,120 A    7/1969  Olson et al.
3,900,574 A *  8/1975  Warwick ................ A23C 19/16
                                             99/464
(Continued)

FOREIGN PATENT DOCUMENTS

JP    3610514 B2    10/2004
JP    2015035961 A   2/2015
(Continued)

OTHER PUBLICATIONS

Vernier, Frédéric, "International Search Report and Written Opinion of the International Searching Authority for International Application No. PCT/IB2021/051817", European Patent Office, May 10, 2021.

(Continued)

*Primary Examiner* — Brent T O'Hern
(74) *Attorney, Agent, or Firm* — Florek & Endres PLLC

(57) ABSTRACT

A cheese product with a carrageenan casing comprises soft cheese encapsulated in a casing comprising carrageenan. The cheese product can be manufactured by forming a coating comprising carrageenan around a soft cheese, for example by co-extruding the soft cheese within a liquid coating material comprising carrageenan such that the coating material forms a tubular coating around the cheese. The cheese product can be used to form the stuffing in a stuffed-crust pizza.

14 Claims, 3 Drawing Sheets

(51) Int. Cl.
*A23C 19/09* (2006.01)
*A23C 19/16* (2006.01)

(58) Field of Classification Search
USPC .......................................................... 426/582
See application file for complete search history.

(56) References Cited

U.S. PATENT DOCUMENTS

| | | | |
|---|---|---|---|
| 4,911,935 | A | 3/1990 | Fillaud et al. |
| 5,225,222 | A | 7/1993 | Cha et al. |
| 6,299,915 | B1 | 10/2001 | Nussinovitch et al. |
| 2005/0175747 | A1 | 8/2005 | Seguer Bonaventura et al. |
| 2006/0188615 | A1* | 8/2006 | Wilfer .................... A23B 4/048 426/138 |

FOREIGN PATENT DOCUMENTS

| | | |
|---|---|---|
| WO | 199834493 A1 | 8/1998 |
| WO | 2007042096 A1 | 4/2007 |
| WO | 2008110550 A1 | 9/2008 |
| WO | 2016181311 A1 | 11/2016 |

OTHER PUBLICATIONS

Ringrose, Tom, "Examination Report under Section 18(3) for GB Patent Application No. GB2003196.9," United Kingdom Intellectual Property Office, Jun. 24, 2022.

N Kampf, A Nussinovitch,, "Hydrocolloid coating of cheeses," Food Hydrocolloids, vol. 14, Issue 6, 2000, pp. 531-537, ISSN 0268-005X, abstract https://doi.org/10.1016/S0268-005X(00)00033-3. (https://www.sciencedirect.com/science/article/pii/S02-68005X00000333.

Ringrose, Tom, "Examination Report under Section 18(3) for Great Britain Patent Application No. GB2003196.9," United Kingdom Intellectual Property Office, Oct. 18, 2022.

* cited by examiner

CHEESE PRODUCT WITH CARRAGEENAN CASING

TECHNICAL FIELD OF THE INVENTION

The present invention relates to a cheese product, a method of manufacturing a cheese product, a method of manufacturing a stuffed crust pizza comprising such a cheese product and a stuffed crust pizza comprising the cheese product.

BACKGROUND TO THE INVENTION

Cheese products with casings, including coatings, are known. WO2016/181311 proposes a coated cheese product with general application, but particularly suited to stuffed crust pizzas, in which a filling is formed in the crust of a pizza. As WO2016/181311 explains, the most common filling is cheese. Currently, to form a stuffed crust pizza, a rope of semi-hard cheese, normally a processed semi-hard cheese, is placed around the circumference of a pizza near the edge, but leaving sufficient excess bread such that the edge can be folded/rolled over the rope of cheese to encapsulate it. Typically, this semi-hard cheese rope collapses somewhat during cooking creating a cavity within the crust.

These semi-hard cheese ropes suffer certain disadvantages, in particular, in comparison to soft cheeses (including cream cheeses), they can collapse during cooking, the mouthfeel is less desirable, can be bland in taste and provide a less suitable vehicle to carry flavours. However, owing to their soft nature, soft cheeses are not suitable for the handling operations required to introduce them into the crust of a pizza, e.g. a rope of soft cheese cannot be formed and picked up by hand.

To address this problem, WO2016/181311 proposes provided a cheese product comprising soft cheese (including cream cheese) encapsulated in a tubular casing. In particular, WO2016/181311 proposes either filling an edible vegetable based casing, such as the Ascona® NutraCasing® using a sausage stuffing machine, in order to provide the casing, or forming a casing around a cheese product, by pumping soft cheese through a liquid coating material such that the coating material forms a tubular casing around the cheese. The coating material proposed by WO2016/181311 is alginate. WO2016/181311 proposes that the coating may be cured in-situ, e.g. by running the coated product into a further bath containing a curing agent, such as chloride.

WO2016/181311 indicates that the casing should preferably break down at 100 degrees C. One example is given, in which a pizza containing a soft cheese formed in Ascona® NutraCasing® is cooked at 350 degrees C., and the casing is said to completely break down. No data is provided in relation to the alginate coated product. However, in practice, it has been found that when an alginate coated cheese product is formed, the coating will not break down fully when introduced into a pizza base and cooked under normal conditions (in terms of temperature and time). It has been determined that this problem can be solved by simply passing the alginate coated cheese product through a phosphate solution before putting it into the pizza base, as the phosphate helps break down the coating by the time it is cooked, but remaining sufficiently intact in the seconds/minutes after immersion to allow it to be easily manipulated.

Despite this solution, it is an object of this invention to provide an improved coated cheese product.

SUMMARY OF THE INVENTION

In broad terms, the invention concerns the use of carrageenan as a casing for a cheese product comprising soft cheese.

According to a first aspect of the present invention, there is provided a cheese product comprising soft cheese (including cream cheese) encapsulated in a casing comprising carrageenan.

Those skilled in the art will be familiar with the expression "soft cheese", which is used to describe a product which is cream cheese or any cheese with a moisture content which exceeds 50%.

The casing may be a coating. Those skilled in the art will appreciate that a coating can be considered a subset of the genre "casing", being one which is formed by coating, such as by co-extrusion. A coating can be neater and more aesthetically pleasing than a traditional casing, such as a sausage casing—i.e. a separate tube, which has been stuffed with its contents. Also without the twists at the end of the casing, coated products can be more suitable for stuffing in other food products.

The casing may be a solid casing. The solid casing is preferably not a gel. The solid casing may be flexible. The solid casing may be resilient.

The inventors have surprisingly found that a coating comprising carrageenan degrades at a suitably low temperature in a moist environment (such as found when wrapped in bread dough in a pizza crust) without requiring a further processing step to initiate degradation (as required with alginate).

The carrageenan may be a carrageenan that gels with potassium or divalent ions. Examples of such carrageenans are kappa and iota.

The carrageenan may be (or may comprise) sodium kappa carrageenan, i.e. the sodium salt form of kappa carrageenan, which is a commercially unusual form of carrageenan, not normally used in industry on account of cost (with most commercial carrageenan being produced in a potassium form). Sodium kappa carrageenan may be the only carrageenan comprised in the liquid unreacted casing. Sodium kappa carrageenan may be the only carrageenan from which the casing is formed. It has been found that sodium kappa carrageenan is suitable for forming a coating, by a co-extrusion method at room temperature (or even lower, such as down to 5 degrees C. since it is soluble in cold water). Once the liquid sodium carrageenan coated cheese is dipped in a salt bath (e.g. a potassium salt bath), the carrageenan forms a coating that is strong, resilient and degrades at a suitably low temperature without requiring a further processing step to initiate degradation (as required with alginate).

By contrast, whilst other carrageenans can degrade at a suitably low temperature, the temperature at which they change from a gel to a liquid solution is higher, so they need to be "hot-mixed" and can block the head of a co-extrusion machine if not kept hot enough. The carrageenan may alternatively be Iota carrageenan, or a mixture including Iota carrageenan and kappa carrageenan (especially sodium kappa carrageenan). It is preferable for the carrageenan to have a low potassium and low divalent content, as this reduces the gel point. For example, the potassium/divalent content may be less than 10 mM, less than 5 mM or less than 2 Mm.

The carrageenan may even be, or comprise (optionally in a mixture with the other carrageenans mentioned above) semi-refined carrageenan, or gel press carrageenan. This naturally has higher levels of potassium and would need to be co-extruded at a higher temperature, which is considered less preferable, but owing to the fact that it would still degrade at a suitable temperature is considered acceptable. However, it is preferred that the carrageenan is, or comprises alcohol precipitated sodium carrageenan, which generally has a lower minimum temperature for dissolving.

The casing/coating comprising carrageenan may comprise at least 0.01%; at least 0.05%; at least 0.1%; at least 1% or at least 2% carrageenan; optionally at least 0.01%; at least 0.05%; at least 0.1%; at least 1% or at least 2% sodium kappa carrageenan. The casing/coating comprising carrageenan may comprise no more than 20%; no more than 15%; no more than 10%; or no more than 8% carrageenan; optionally no more than 20%; no more than 15%; no more than 10%; or no more than 8% sodium kappa carrageenan.

Particular ranges of interest are 0.1% to 15%, in particular 0.1 to 8% and most especially 1% to 8% carrageenan, especially 0.1% to 15%, 0.1 to 8% or 1% to 8% sodium kappa carrageenan.

The casing/coating comprising carrageenan may further comprise additives, such as other hydrocolloids (i.e. hydrocolloids other than carrageenan or other than sodium kappa carrageenan) and water.

The casing/coating may consist of (or be formed from) carrageenan (for example sodium kappa carrageenan), optional additives (for example other hydrocolloids) and water, plus, optionally, any incidental impurities. By incidental impurities, we mean impurities which may be present in the casing composition in trace amounts e.g. as a result of the production process, which are not added deliberately and have no impact or effect on the properties of the casing composition.

In one embodiment the casing/coating composition (or the composition from which the casing/coating is formed) comprises 0.1-8% carrageenan (for example sodium kappa carrageenan), 0-10% additives (for example other hydrocolloids) and 82-99.9% water.

In another embodiment the casing/coating composition (or the composition from which the casing/coating is formed) consists of 0.1-8% carrageenan (for example sodium kappa carrageenan), 0-10% additives (for example other hydrocolloids) and 82-99.9% water. Optionally the casing/coating composition also includes incidental impurities.

In yet another embodiment the casing/coating composition (or the composition from which the casing/coating is formed) comprises 1-8% carrageenan (for example sodium kappa carrageenan), 0-10% additives (for example other hydrocolloids) and 82-99% water.

In a further embodiment the casing/coating composition (or the composition from which the casing/coating is formed) consists of 1-8% carrageenan (for example sodium kappa carrageenan), 0-10% additives (for example other hydrocolloids) and 82-99% water. Optionally the casing/coating composition (or the composition from which the casing/coating is formed) also includes incidental impurities.

The other hydrocolloids may be selected hydrocolloids other than sodium kappa carrageenan, or other than carrageenan, for example, selected from starch, guar gum, locust bean gum and xanthan gum. These gums are all water soluble and non-gelling and could be added to increase viscosity without interfering with the gel too much.

The casing may contain at least 90% soft cheese, preferably at least 95% soft cheese, more preferably at least 99% soft cheese and most preferably only soft cheese.

The cheese product may consist of soft cheese encapsulated by a casing. At least 90%, at least 95%, or at least 99% of the outer surface of the soft cheese may be encapsulated by the casing/coating. The casing/coating may be tubular. The cheese product may be elongate with a longitudinal axis and the casing/coating may not fully cover the axial ends of the cheese product, but may fully cover the circumferential side/sides. A small axially inwardly extending flange at the ends may be provided. This can be sufficient to avoid the cheese escaping during normal handling, without the ugliness of a twist, for example to entirely cover the ends.

The soft cheese may be heat-stable. Those skilled in the art will understand the term heat stable to mean a cheese (either coated or used as a filling) capable of withstanding cooking temperatures through frying, deep frying, baking or grilling, without the fats and moistures separating and running off.

The soft cheese may be heat stable at a temperature of at least 150 degrees C., preferably at least 200 degrees C., more preferably at least 250 degrees C. and most preferably at least 300 degrees C. Whilst pizza ovens may operate at up to 350 degrees C., or more, the cheese itself is typically shielded from the heat, so being stable to at least 220 degrees C. is normally suitable, but higher is preferred.

The soft cheese may be cream cheese. That is to say cream cheese is classified as a soft cheese and is especially suitable to carrying flavours and has an excellent mouthfeel.

In one particular embodiment, the cream cheese may be a cheese as defined by the US Food and Drugs Administration Code of Federal Regulations (annual edition)—Apr. 1, 1996 Edition, Title 21, Chapter I, Subchapter B, Part 133, Subpart B, Sec. 133.133, as a cream cheese.

However, it is noted that the expression "cream cheese" is to be understood as broader than that defined by the USFDA and in particular includes cheese with a moisture content of greater than 55%, as exemplified by Dairygold® American style soft cheese (Set) (10225179) (available from Dairygold® Food Ingredients of Cork, which has a moisture content of 60.5% and a fat content of 29.2%.

The soft cheese may comprise a cheese defined as a soft ripened cheese by the US Food and Drugs Administration Code of Federal Regulations Apr. 1 2014 revision, TITLE 21, CHAPTER I, SUBCHAPTER B, PART 133, Subpart B Sec. 133.182 Soft ripened cheeses.

The casing may break down and disintegrate at a temperature of 220 degrees C., preferably at a temperature of 150 degrees C., more preferably at a temperature of 100 degrees C. and even more preferably at 70 degrees C. In particular, the casing may completely disintegrate leaving no trace visible to the naked eye, when heated in a moist environment, in particular when wrapped in bread dough in a pizza crust, at a temperature of 300 degrees C., 250 degrees C., 220 degrees C., or 200 degrees C. for 4 minutes, 5 minutes, 8 minutes or 10 minutes. As set out above it is preferable that the casing completely disintegrates as the temperature rises, in order that the casing is not a barrier between the inside of the crust and the cheese within.

The cheese product may be in the form of a rope, that is to say, a product that is substantially longer than it is wide. Accordingly, the casing may have a length of at least twice its diameter, preferably at least four times its diameter, more preferably at least 5 times its diameter and most preferably at least 10 times its diameter. Suitably the diameter of the tubular casing is between 6 mm and 30 mm, e.g. between 10 mm and 30 mm. Suitably the length is at least 50 mm, preferably at least 100 mm, more preferably at least 300 mm and most preferably between 400 and 600 mm. The length may be up to 1 metre, e.g. between 800 and 1200 mm, or as little as 10-30 mm. Around 50 cm is ideal for two cheese products to be placed end-to-end around the circumference of an 11 inch (28 cm) pizza. Even longer cheese products, e.g. about 100 cm could be used, so that only one such product is required to encase an entire 11 inch pizza, and of course cheese products of more than 100 cm could be used for larger pizzas.

The casing may be comprised in a pizza base.

The casing may be comprised in the pizza base of a pizza.

According to a second aspect of the invention there is provided a method of forming a cheese product according to the first aspect of the invention forming a coating comprising carrageenan around a soft cheese.

The method may comprise co-extruding a soft cheese with a coating material (such as a liquid solution or gel) comprising carrageenan such that the coating material forms a tubular coating around the cheese.

The method may comprise passing the coated cheese product through a setting solution to set the coating. The setting solution may be a salt bath. The setting solution may comprise potassium ions or divalent ions to set the coating. The setting solution may comprise calcium ions. The setting solution may be potassium chloride solution, for example 0.1-5 M KCl solution, e.g. 3 M KCl solution. This is especially useful when the coating material is cold-co-extruded, using a coating material that is liquid/gel at room temperature, e.g. a coating material comprising sodium kappa carrageenan.

The method may comprise washing the set coated cheese product, e.g. with water. This can reduce the residual potassium salt taste. In some embodiments, the set coated cheese product may not be washed, as the taste of the residual potassium salt may be desirable (or at least not undesirable).

The co-extrusion may be a cold-fill co-extrusion. The cold-fill coextrusion may for example be carried out at a temperature of less than 40 degrees C., e.g. 20-40 degrees C. This is particularly suitable when the carrageenan is sodium kappa carrageenan. Alternatively the co-extrusion may be a hot-fill co-extrusion. The hot-fill coextrusion may for example be carried out at a temperature of at least 55 degrees C., e.g. 60-80 degrees C. This is particularly suitable when the carrageenan is not sodium kappa carrageenan.

The optional and preferred features of the first aspect of the invention apply equally to the second aspect of the invention.

For example in terms of the a coating material (such as a liquid solution or gel):

The carrageenan may be sodium kappa carrageenan, or any of the other carrageenans or combinations of carrageenans set out above.

The coating composition may comprise at least 0.01%; at least 0.05%; at least 0.1%; at least 1% or at least 2% carrageenan; optionally at least 0.01%; at least 0.05%; at least 0.1%; at least 1% or at least 2% sodium kappa carrageenan.

The coating composition may comprise no more than 20%; no more than 15%; no more than 10%; or no more than 8% carrageenan; optionally no more than 20%; no more than 15%; no more than 10%; or no more than 8% sodium kappa carrageenan.

Particular ranges of interest of the coating composition are 0.1% to 15%, in particular 0.1 to 8% and most especially 1% to 8% carrageenan, especially 0.1% to 15%, 0.1 to 8% or 1% to 8% sodium kappa carrageenan.

The coating composition may further comprise additives, such as other hydrocolloids and water.

The coating composition may consist of carrageenan (for example sodium kappa carrageenan), optional additives (for example other hydrocolloids) and water, plus, optionally, any incidental impurities.

In one embodiment the coating composition comprises 0.1-8% carrageenan (for example sodium kappa carrageenan), 0-10% additives (for example other hydrocolloids) and 82-99.9% water.

In another embodiment the coating composition consists of 0.1-8% carrageenan (for example sodium kappa carrageenan), 0-10% additives (for example other hydrocolloids) and 82-99.9% water. Optionally the casing/coating composition also includes incidental impurities.

In yet another embodiment the coating composition comprises 1-8% carrageenan (for example sodium kappa carrageenan), 0-10% additives (for example other hydrocolloids) and 82-99% water.

In a further embodiment the coating composition consists of 1-8% carrageenan (for example sodium kappa carrageenan), 0-10% additives (for example other hydrocolloids) and 82-99% water. Optionally the coating composition also includes incidental impurities.

The other hydrocolloids may be selected from starch, guar gum, locust bean gum and xanthan gum.

The coating may be applied to contents of at least 90% soft cheese, preferably at least 95% soft cheese, more preferably at least 99% soft cheese and most preferably only soft cheese.

The method may produce a cheese product consisting only of soft cheese encapsulated by a coating.

The properties of the soft cheese may be as set out in respect of the first aspect of the invention.

The coating may break down and disintegrate at a temperature of 220 degrees C., preferably at a temperature of 150 degrees C. and more preferably at a temperature of 100 degrees C. In particular, the coating may completely disintegrate leaving no trace visible to the naked eye, when heated in a sufficiently moist environment to saturate the carrageenan, e.g. where the surrounding air is saturated, in particular when wrapped in bread dough in a pizza crust, at a temperature of 300 degrees C., 250 degrees C., 220 degrees C. or 100 degrees C. for 4 minutes, 5 minutes, 8 minutes, or 10 minutes. As set out above it is preferable that the casing completely disintegrates as the temperature rises, in order that the casing is not a barrier between the inside of the crust and the cheese within.

The form and dimensions of the cheese product produced according to the method of the second aspect of the invention may be as set out in respect of the first aspect of the invention.

In a third aspect of the invention there is provided a method of producing a cheese stuffed product, comprising a cheese product according to the first aspect of the invention (optionally including any optional features) or a cheese product produced according to the method of the second aspect of the invention (optionally including any optional features) into another foodstuff.

The method of producing a cheese stuffed product may comprise introducing the cheese product into bakery products, such as bagels or croissants, meat/poultry products, e.g. chicken breast, to form stuffed chicken breast, steaks, to form stuffed steak products, or inside sausages such as chorizo.

Alternatively, the method of producing a cheese stuffed product may be a method of forming a stuffed-crust pizza comprising providing a pizza base; providing a cheese product according to the first aspect of the invention (optionally including any optional features) or a cheese product produced according to the method of the second aspect of the invention (optionally including any optional features); and encasing the cheese product in the pizza base.

The method may comprise encasing the cheese product in the pizza base without first performing any further processing steps on the cheese product to initiate degradation of the casing.

The method may further comprise applying toppings to the pizza base and baking it in an oven, such as a pizza oven.

The method may comprise applying the cheese product around the circumference of the pizza base and folding over the edges of the pizza base to encase the product.

The method may comprise providing at least two cheese products at different regions of the circumference of the pizza.

The at least two cheese products may comprise soft cheeses having different flavours.

The foodstuff into which the cheese product is stuffed, for example the bread dough of a stuffed crust pizza, may have a sufficient moisture content/water content to saturate the air surrounding the coating when heated.

A relatively high moisture content, such as found in typical pizza bread doughs, assists in the disintegration of the coating of the cheese product, leaving no visible trace.

DETAILED DESCRIPTION OF THE INVENTION

In order that the invention may be more clearly understood an embodiment thereof will now be described, by way of example only, with reference to the accompanying drawings, of which:

Figure 1:
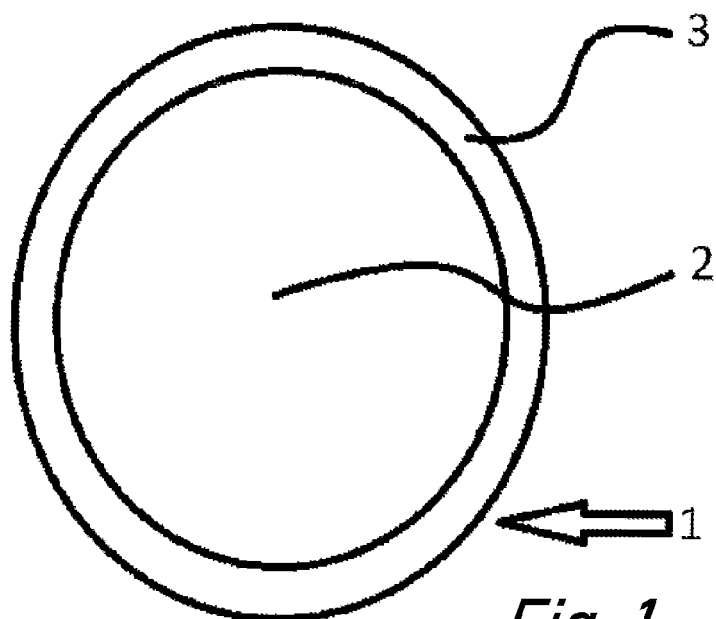
FIG. 1 shows a lateral cross section through the cheese product of the invention.
Figure 2:
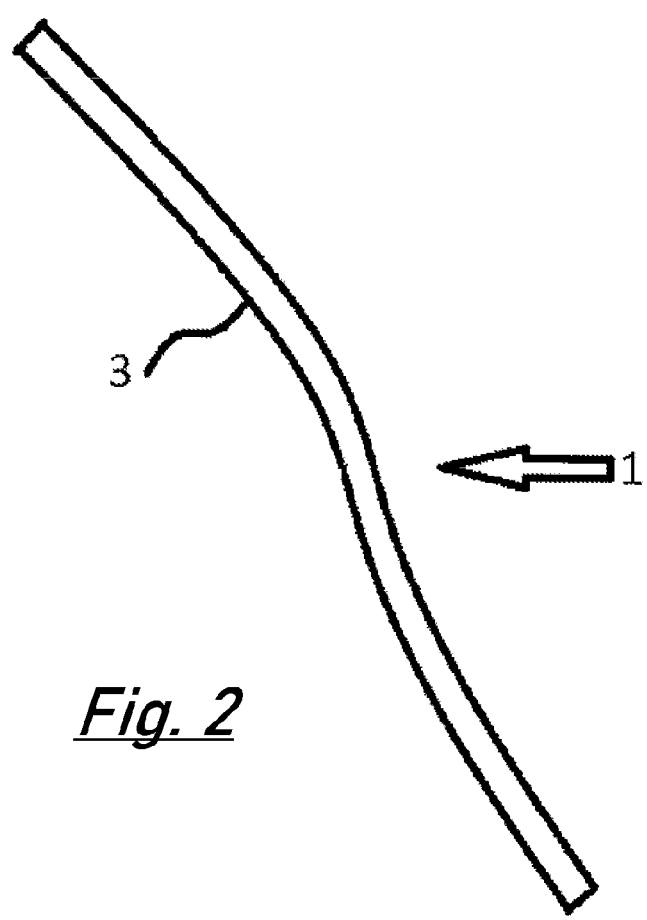
FIG. 2 shows a plan view of the cheese product of FIG. 1.

Referring to FIGS. 1 and 2, a cheese product 1, consists of a casing 3 (shown at a much exaggerated thickness in FIG. 1), which encapsulates a heat-stable soft cheese 2. The casing is a coating comprising carrageenan made in accordance with the examples set out below. The casing 3 is tubular, and is secured at both ends by an inwardly extending flange in order to encapsulate the soft cheese 2, covering the entire outer circumferential surface and all but at the centre of the ends.

Figure 4:
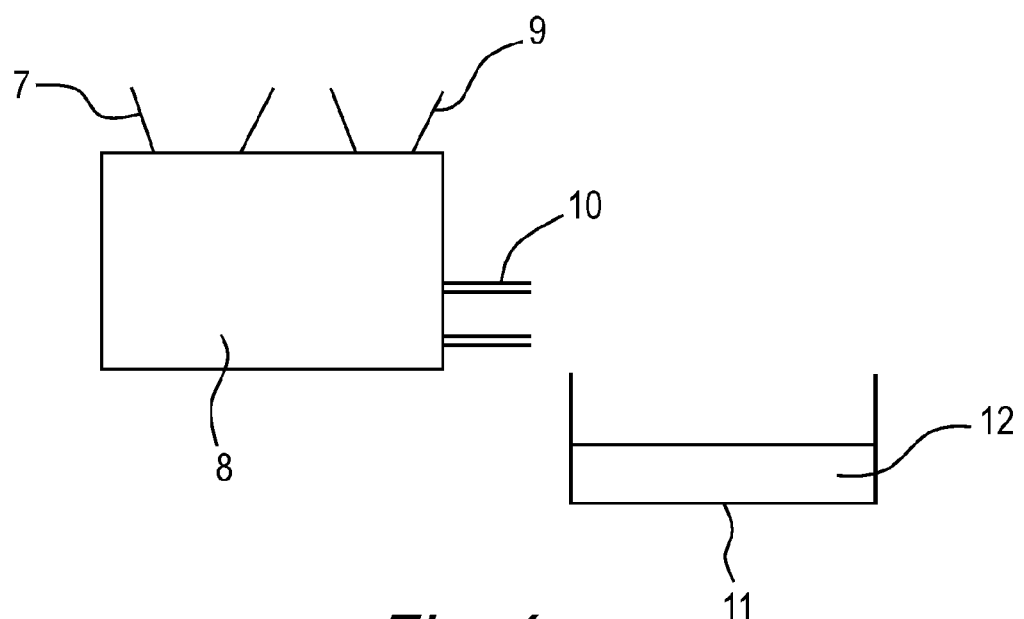
FIG. 4 shows a schematic diagram of the apparatus used in the manufacture of the cheese product of FIGS. 1 and 2.

With reference to FIG. 4, the cheese product 1 may be produced by placing the soft cheese 2 in a first hopper 7 of a co-extrusion machine 8, and placing a coating composition comprising carrageenan made in accordance with one of the examples below into a second hopper 9 of the co-extrusion machine, and pumping the soft cheese 2 and coating composition through a co-extrusion head 10, such that the coating composition forms a coating film on the outer surface of the cheese product. The coated cheese product then passes into a bath 11 containing a curing agent 12, for example, potassium chloride solution, to cure the coating composition to form the coating/casing 3. The cheese product can be cut into lengths (e.g. of about 50 cm) as it leaves the co-extrusion head 10, such that the coating coats at least part of the ends to form the inwardly extending flange which secure the casing. Suitable machines to carry out this method are available from Handtmann®. In particular, the following machines can be used: Handtmann® VF 616; Handtman® VF608 Plus and AL Handtmann® 152-21.

Figure 3:
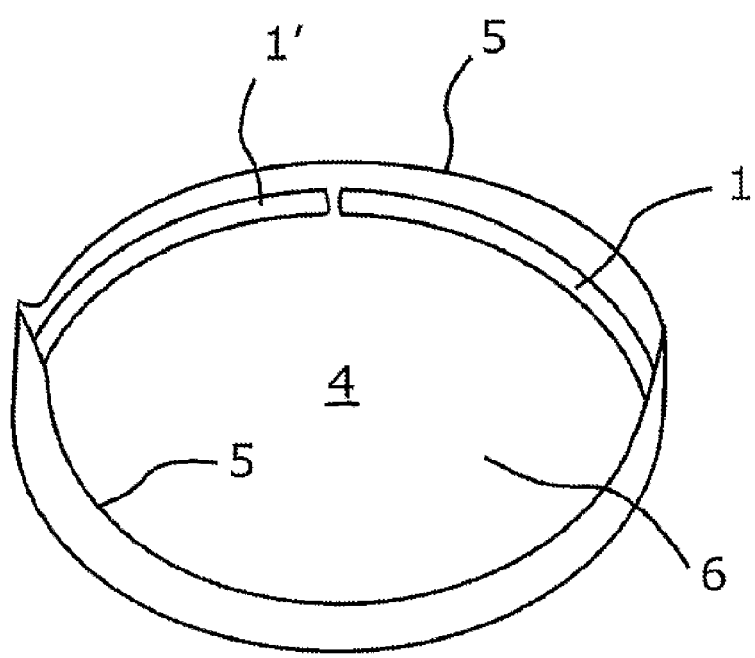
FIG. 3 shows a perspective view of a part formed pizza base including the cheese product of FIGS. 1 and 2.

Having formed the cheese product 1, it is used to form a stuffed crust pizza. Thus, with reference to FIG. 3, a circular pizza base 4 of, in this embodiment, a 35 cm diameter is provided on a surface and two 50 cm long cheese products 1, 1' are placed end to end around the circumference of the pizza base on its upper surface 6, to form a circle, approximately 5 cm inwards of the edge 5 of the base 4. The edge 5 is then folded inwards over the cheese products 1 1' to encapsulate them and form a stuffed crust. Toppings are then applied to the upper surface 6 of the pizza base and it is baked in a pizza oven (at e.g. 350 degrees C.) to form a pizza.

During baking, the coating 3 will reach a high enough temperature, in a moist environment (owing to the bread dough surrounding it) at which point it will disintegrate, whilst the soft cheese 2 within will remain stable.

Tests carried out using coating compositions manufactured in accordance with the examples below all produced stuffed crust pizzas in which (with the bread dough removed) no visible trace remained of the coating composition.

EXAMPLES

In each example of the invention, a heat stable soft cheese, in particular a cream cheese, was formed by the following method for a 72 kg batch:

Ingredients: 33% (23.76 Kg Ireland/UK) Full Fat Soft Cheese, 14% (10.08 Kg Ireland/UK) Fresh Curd, 11% (7.92 Kg Ireland/UK) Low Fat Soft Cheese, 11% (7.92 Kg Ireland/UK) Mild Cheddar, 11% (7.92 Kg Ireland/UK) Mature Cheddar, 10% (7.2 Kg Ireland) Water, 6% (4.32 Kg Ireland) Natural Cheese Flavour, 2% (1.44 Kg/Thailand) Starch, 1.9% (1.37 Kg Germany) Stabilisers (E331, E339, E452), <0.1% (<0.072/Kg China) Potassium Sorbate (E202), <0.1% (<0.072/Kg Belgium) Lactic Acid (E270).

All cheese ingredients are placed in a Stephan® Cooker UMSK80 and blended with direct steam heat injection to 40° C. The Stephan® Cooker UMSK80 is reopened and all remaining ingredients added. The mix is further blended with direct steam heat injection to 78° C. Direct steam is shut off at this point and product held for 1 minute at this temperature. The contents of the Stephan® Cooker UMSK80 are then pumped directly to a stainless steel holding vessel. The product is then chilled and allowed to cool fully to <5° C.

In each example, the cooled heat stable soft cheese was loaded into one hopper of a co-extrusion machine and co-extruded at room temperature within a casing formed by the coating compositions set out below, loaded into another hopper thereof. In example recipes 1-5 and 7 the sodium kappa carrageenan used was Carrageenan TS1980 by CP Kelco®. Example 6 uses iota carrageenan, Genutine® 310-C by CP Kelco®.

Example Recipe 1

Sodium kappa carrageenan (3.25%) is slowly added under stirring to water (96.75%) at room temperature. Solution is stirred for 2 hours. Casing is extruded immediately and set in a 3M KCl bath.

Example Recipe 2

Sodium kappa carrageenan (2-6%) is slowly added under stirring to water (98-94%) at room temperature. Solution is stirred for 2 hours. Casing is extruded immediately and set in a 1-3M KCl bath. Casing washed with water directly after setting bath.

Example Recipe 3

Sodium kappa carrageenan (1.75%) and guar gum (0.5%) are dry-blended. Blend is slowly added under stirring to water (97.75%) at room temperature. Solution is stirred for 2 hours. Casing is extruded immediately and set in a 3M KCl bath.

Example Recipe 4

Sodium kappa carrageenan (1.5%) and locust bean gum (0.5%) are dry-blended. Blend is slowly added under stirring to water (98%) at room temperature.
Solution is stirred for 2 hours. Casing is extruded immediately and set in a 3M KCl bath.

Example Recipe 5

Sodium kappa carrageenan (1.5%) and xanthan (0.5%) are dry-blended. Blend is slowly added under stirring to water (98%) at room temperature. Solution is stirred for 2 hours. Casing is extruded immediately and set in a 3M KCl bath.

Example Recipe 6

Iota carrageenan (6%) is slowly added under stirring to water (94%) at room temperature. Solution is stirred for 2 hours. Casing is extruded immediately and set in a 3M KCl bath.

Example Recipe 7

Starch (4.5%) is precooked in water (55.5%) and cooled. Sodium kappa carrageenan is slowly added under stirring to water (38.5%) at room temperature. Solution is stirred for 30 min, followed by addition of the starch solution (<40° C.) to the carrageenan dough. Dough is further mixed for 1.5 hours. Casing is extruded immediately and set in a 3M KCl bath.

The cheese product 1 using the coating composition of each example recipe was then manually handled and placed on a pizza base formed from a dough consisting of bread flour, sugar, salt, instant yeast, olive oil and water, with a moisture content of circa 60%—the product could be picked up with ease and would even suffer a degree of squeezing without breaking or collapsing, in a manner completely impossible prior to encapsulation. The base was folded to enclose the product in the crust, and baked in an oven at 250 degrees C. for 6 minutes. When the cooked pizza base was cut, the casing had completely disintegrated, leaving no visible residue and in view of its heat stability, the soft cheese did not leak out of the crust, nor collapse considerably during cooking to form a cavity within the crust. The mouthfeel and flavour of the cheese in the crust was excellent.

The above embodiments and examples are described by way of example only. Many variations are possible without departing from the scope of the invention as defined in the appended claims. For example, shorter cheese products may be placed into bakery products such as bagels or croissants prior to cooking, or meat/poultry products such as chicken breast, steaks and so forth may be sliced (by hand or machine) and stuffed with the cheese products of the invention (by hand or machine). Sausages, such as chorizo, could even be formed around these cheese products, to provide a soft cheese stuffing.

The invention claimed is:

1. A cheese product comprising a soft cheese encapsulated in a tubular casing, the casing comprising sodium kappa carrageenan, wherein the casing breaks down and completely disintegrates leaving no trace visible to the naked eye, when heated, wrapped in bread dough in a pizza crust, at a temperature of 200 degrees C. for 5 minutes.

2. The cheese product according to claim 1 wherein the casing is a coating.

3. The cheese product according to claim 1 wherein the sodium kappa carrageenan is a mixture comprising Iota carrageenan and kappa carrageenan.

4. The cheese product according to claim 1 wherein the sodium kappa carrageenan comprises, semi-refined carrageenan, or gel press carrageenan.

5. The cheese product according to claim 1 wherein the sodium kappa carrageenan comprises alcohol precipitated carrageenan.

6. The-cheese product according to claim 1 wherein the casing comprising the sodium kappa carrageenan comprises at least 0.1% by weight of the sodium kappa carrageenan.

7. The cheese product according to claim 1 wherein the casing comprising the sodium kappa carrageenan comprises no more than 8% by weight of the sodium kappa carrageenan.

8. The cheese product according to claim 1 wherein the casing comprising the sodium kappa carrageenan comprises 0.1% to 15% by weight of the sodium kappa carrageenan.

9. The cheese product according to claim 1 wherein the casing comprises 0.1-8% by weight of the sodium kappa carrageenan, 0-10% by weight of additives and 82-99.9% by weight of water.

10. The cheese product according to claim 1 wherein the casing consists essentially of 0.1-8% by weight of the sodium kappa carrageenan, 0-10% by weight of additives and 82-99.9% by weight of water.

11. The cheese product according to claim 1 wherein the casing comprises 1-8% by weight of the sodium kappa carrageenan, 0-10% by weight of hydrocolloids and 82-99% by weight of water.

12. The cheese product according to claim 1 wherein the casing consists essentially of 1-8% by weight of the sodium kappa carrageenan, 0-10% by weight of hydrocolloids and 82-99% by weight of water.

13. The cheese product according to claim 1 consisting essentially of the soft cheese encapsulated by the casing.

14. The cheese product according to claim 1 wherein the casing is a solid and not a gel.

* * * * *